United States Patent
Hummer et al.

(10) Patent No.: US 8,756,073 B2
(45) Date of Patent: Jun. 17, 2014

(54) HEALTHCARE POINT OF SERVICE ADJUDICATION AND PAYMENT SYSTEM

(76) Inventors: Gregory J. Hummer, Shaker Heights, OH (US); John J. Guiher, Strongsville, OH (US)

(*) Notice: Subject to any disclaimer, the term of this patent is extended or adjusted under 35 U.S.C. 154(b) by 712 days.

(21) Appl. No.: 12/893,321

(22) Filed: Sep. 29, 2010

(65) Prior Publication Data

US 2011/0295614 A1  Dec. 1, 2011

Related U.S. Application Data

(60) Provisional application No. 61/348,345, filed on May 26, 2010.

(51) Int. Cl.
*G06Q 50/00* (2012.01)
(52) U.S. Cl.
USPC .................................................. 705/2; 705/4
(58) Field of Classification Search
USPC ........................................................ 705/2–4
See application file for complete search history.

(56) References Cited

U.S. PATENT DOCUMENTS

| | | | |
|---|---|---|---|
| 7,970,626 B2* | 6/2011 | Cracchiolo et al. | 705/2 |
| 2006/0167720 A1* | 7/2006 | Harrison et al. | 705/2 |
| 2006/0212378 A1* | 9/2006 | Hoffman et al. | 705/35 |
| 2006/0265326 A1* | 11/2006 | Barrett | 705/40 |
| 2007/0007335 A1* | 1/2007 | Cracchiolo et al. | 235/380 |
| 2007/0011088 A1* | 1/2007 | Cracchiolo et al. | 705/39 |
| 2009/0099869 A1* | 4/2009 | Darin et al. | 705/3 |
| 2010/0042537 A1* | 2/2010 | Smith et al. | 705/40 |
| 2010/0084462 A1* | 4/2010 | Scipioni et al. | 235/380 |

* cited by examiner

*Primary Examiner* — Mark Holcomb
(74) *Attorney, Agent, or Firm* — Fay Sharpe LLP (57) ABSTRACT

Systems and methods are described that facilitate providing an online, automated payment architecture that aggregates funds from multiple health-related accounts (e.g., a member's HSA, an employer's advance account, etc.) and automatically transfers the aggregated funds to a healthcare provider's account to pay a bill or invoice. According to other aspects, healthcare fraud is prevented by storing electronic images of members and their dependents, wherein the images can be recalled by a healthcare provider at the point of service to verify that the member or dependent is actually a covered member. In other aspects, the described systems and methods permit members to negotiate reduced invoice payments in exchange for prompt delivery of payment funds.

17 Claims, 4 Drawing Sheets

FIG. 4 ical funds for other goods and services other than the
HEALTHCARE POINT OF SERVICE ADJUDICATION AND PAYMENT SYSTEM The present application claims the benefit of U.S. Provisional Application No. 61/348,345, filed May 26, 2010, which is incorporated herein by reference in its entirety.

BACKGROUND

The subject application relates to a healthcare payment system that prevents patient fraud and merges healthcare banking (e.g., a health savings account, etc.) website information with healthcare insurance website information to facilitate payment to a healthcare provider while adjudicating the payment. While the described systems and methods relate to healthcare payments, it will be appreciated that the described features and aspects may find application in other payment systems or methods, other healthcare information systems, and the like.

Conventional healthcare payment systems involving a health savings account (HSA) or an health reimbursement account (HRA) employ a debit card system, whereby a patient visits a healthcare provider (e.g., a doctor, a registered nurse practitioner, a clinic, etc.) and upon leaving, pays all or a portion of the bill for the visit via the debit card. However, a drawback of such systems is that patients don't always know what to pay or can easily abuse the system by using their medical funds for other goods and services other than the required goods or services allowed by law. Healthcare fraud now amounts to over 150 billion dollars a year in the United States. For instance, a covered member can buy non-health related items as long as they check out at the pharmacy swipe machine, which is configured in the credit card system as a pharmacy. This would then allow the misuse of the medical funds in an HSA account or other type of medical account. Another type of fraud can be perpetrated when, for example, an aunt fraudulently takes her niece or nephew to see a doctor, while claiming that the niece or nephew is actually her child and therefore covered by her family health insurance plan. This type of fraud occurs quite frequently because there are few if any measures by which a healthcare provider can verify the identity of a child brought in by an adult, or even that the adult is using a friend's or another person's health card to seek care.

Another type of fraud that frequently occurs with health savings accounts occurs at the pharmacy counter in a drug store or the like. Many HSAs permit patients to purchase over-the-counter health-related items (e.g., cough medicine, anti-itch creams, etc.) using funds in the HSA, and these purchases are applied to the patient's annual deductible. However, a dishonest patient's often attempt to purchase non-medical items in this manner. For instance, a patient may approach the pharmacy counter with a bottle of cough medicine and a candy bar, and attempt to pay for both using his HSA debit card. Even if the teller at the pharmacy counter notices that the patient is using and HSA debit card to buy the candy bar and informs the patient that the candy bar does not qualify as a health-related expense, the patient may merely argue that he is diabetic and therefore the candy bar is medically qualified as a purchase. In any case, this sort of fraud is common and results in increased healthcare costs for all patients.

Another type of fraud occurs when the medical provider submits claims that are fraudulent without the knowledge of the medical card holder.

Accordingly, there is an unmet need for systems and/or methods that facilitate overcoming the aforementioned deficiencies.

BRIEF DESCRIPTION

In accordance with various aspects described herein, systems and methods are described that facilitate online fund aggregation and healthcare invoice payment, as well as healthcare fraud prevention. For example, a system that facilitates online healthcare fund aggregation for payment of healthcare provider invoices comprises a processor that executes computer-executable instructions for aggregating funds from multiple healthcare-related accounts for payment to a healthcare provider, a memory that stores the computer-executable instructions, and a server the comprises the processor and memory and provides Internet access to the processor for fund aggregation and healthcare invoice payment. The instructions comprise receiving an invoice which may be electronic from a healthcare provider, accessing a member account belonging to a member of a healthcare plan, withdrawing funds to pay the invoice amount from the member account, if funds are available in the member account, accessing an employer account maintained by an employer providing the healthcare plan to the member, and withdrawing additional funds from the employer account to satisfy the invoice amount when the member account does not have sufficient funds to satisfy the invoice amount. The instructions further comprise aggregating the funds from the member account and the additional funds from the employer account in an aggregating account (AA), and transferring the aggregated funds from the aggregating account to a healthcare provider account to pay the invoice amount.

According to another feature described herein, a method for online healthcare fund aggregation for payment of healthcare provider invoices comprises receiving an invoice from a healthcare provider, accessing a member account belonging to a member of a healthcare plan, withdrawing funds to pay the invoice amount from the member account, if funds are available in the member account, accessing an employer account maintained by an employer providing the healthcare plan to the member, and withdrawing additional funds from the employer account to satisfy the invoice amount when the member account does not have sufficient funds to satisfy the invoice amount. The method further comprises aggregating the funds from the member account and the additional funds from the employer account in an aggregating account (AA), and transferring the aggregated funds from the aggregating account to a healthcare provider account to pay the invoice amount.

DETAILED DESCRIPTION

In accordance with various features described herein, systems and methods are described that facilitate reducing healthcare fraud and improving the timeliness of patient payment to a healthcare provider. The described systems and methodologies require both the member and the provider to enter a PIN number at the time the invoice is processed, thus preventing purely fraudulent submissions of bills by the provider on behalf of the member.

As used herein, "algorithm" or "module" refers to a set of computer-executable instructions stored on a computer-readable medium and executable by a processor or other computing device, as will be appreciated by those of skill in the art.

Figure 1:
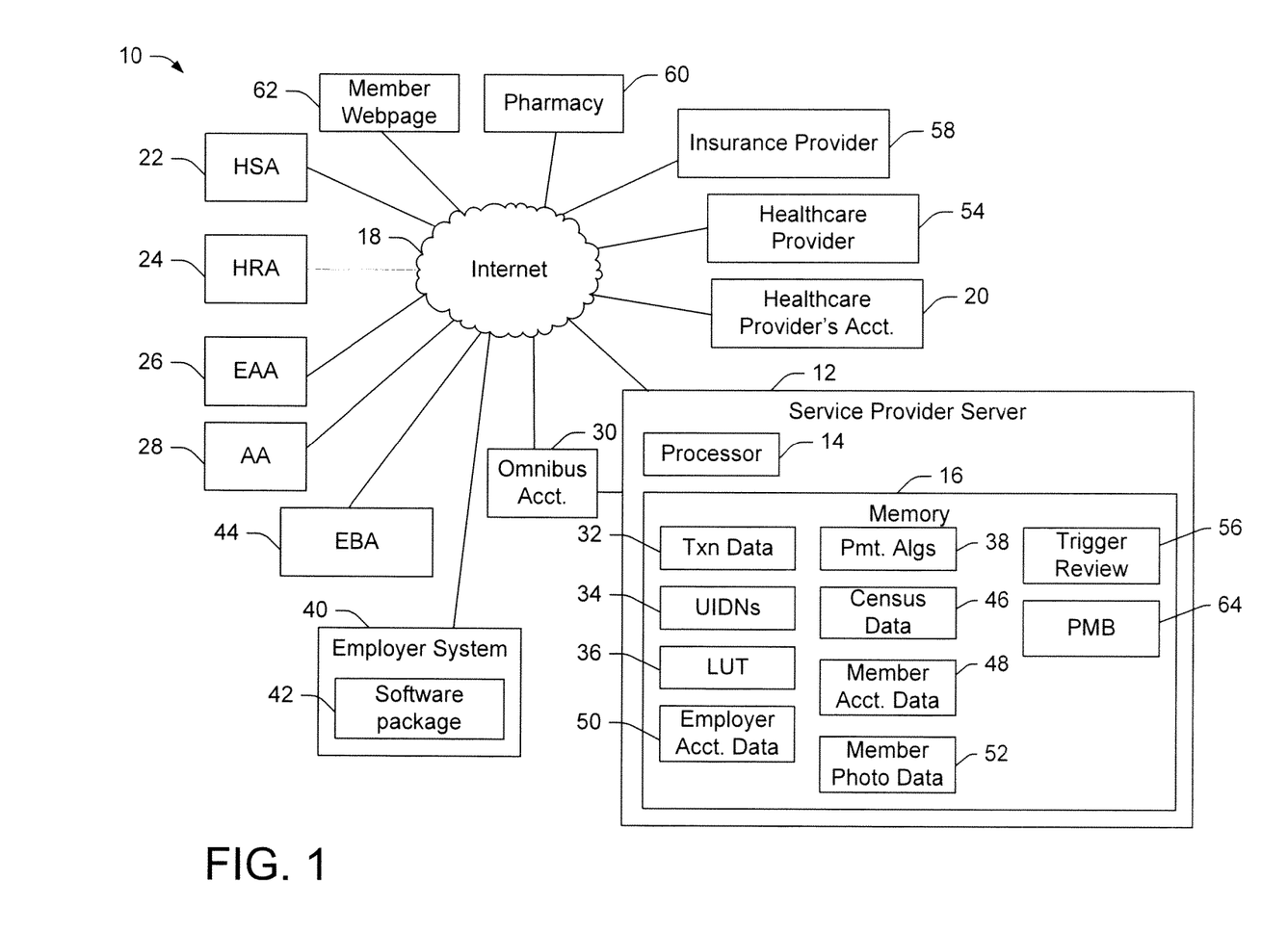
FIG. 1 illustrates a system that facilitates aggregating healthcare payments from a plurality of sources and remitting the payments to a healthcare provider (e.g., a doctor or the like) in accordance with various aspects described herein.

With reference to FIG. 1, a system 10 is illustrated that facilitates aggregating healthcare payments from a plurality of sources and remitting the payments to a healthcare provider (e.g., a doctor or the like) using an automated clearing house (ACH) transaction protocol, in accordance with various aspects described herein. The system 10 includes a server 12 (e.g., operated by a healthcare payment service provider) with a processor 14 that executes, and a memory 16 that stores, computer-executable instructions for performing the various functions, methods, techniques, algorithms, etc., described herein. The server is coupled to the Internet 18, by which it communicates with, accesses, etc., a healthcare provider's account 20 to deposit payments from one or more sources, including but not limited to a health savings account (HSA) 22, a health reimbursement account (HRA) 24, an employer advance account (EAA) 24, an aggregating account (AA) 28, an omnibus account 30, an individual HSA account, an employer bank account (EBA) 44, etc. The EBA 44 may be one or more of an employer's bank account, a line of credit designated by the employer for healthcare-related expenses, or the like.

The HSA 22 and the HRA 24 are collectively may be referred to herein as "member accounts." The EAA 24, EBA 44, and the employer line of credit collectively may be referred to herein as "employer accounts."

The HSA may be any of a number of types of HSAs, as are known, into which a member patient and/or employer deposit money periodically to be used for health-related expenses. A typical HSA is a medical savings account available to taxpayers in the U.S. who are enrolled in a high deductible health plan (HDHP). The funds contributed to the account are not subject to federal income tax at the time of deposit. Unlike a flexible spending account (FSA), funds in an HSA roll over and accumulate year to year if not spent. HSAs are owned by the individual, which differentiates them from the company-owned HRA, which is an alternate tax-deductible source of funds for health-related expenses.

The HRA is typically an employer-funded plan that reimburses employees for incurred medical expenses that are not covered by the company's insurance plan. Because the employer funds the plan, distributions are considered tax deductible to the employer. Reimbursement dollars received by the employee are generally tax free.

The EAA is an employer advance account that is set up by the service provider and into which the employer deposits money and maintains a minimum balance to cover advances to employees who need additional money to pay healthcare bills that come due before sufficient funds have been deposited into the member's HSA.

The aggregating account 26 is set up and maintained by the service provider (e.g., the server 12) and aggregates payments from one or more of the HSA and the HRA, and one or more of the EAA, the EBA, and the line of credit. According to an example, a member (patient) deposits or has deposited on his behalf into his HSA $200 a month for a total of $2400 a year. In this example, the member is employed by an employer having an EAA, EBA, and/or line of credit and owes $500 for a visit to a doctor, but has only $200 in his HSA. The server routes the $200 from the member's HSA to the aggregating account, and routes $300 from the EAA, the EBA, or the line of credit to the aggregating account. The total $500 is then transmitted to the doctor's account as payment for the visit. Transaction data 32 including payment information such as payment amount, payment source, etc., is stored in the memory 16, and each transfer of funds is assigned or associated with a unique identification number (UIDN) (e.g., a tag) 34 that facilitates tracking and updating account information. In this example, the $200 from the HSA and the $300 from the EAA, the EBA, or the line of credit are each assigned a UIDN that may be cross-referenced (e.g., using a lookup table (LUT) 36 or the like stored in memory 16) to identify the transaction, amount, member ID, doctor ID, and any other relevant information associated with the transaction via the UIDN. The member's HSA is flagged as owing $300 to the EAA, the EBA, or the line of credit, from which the $300 was advanced to the member. When a subsequent monthly $200 deposit is made to the member's HSA, the server routes the $200 to the EAA, the EBA, or the line of credit (i.e., the account from which the $300 was borrowed) in partial repayment of the advanced $300 which is for a specific medical bill, and updates the information associated with the transaction via the UIDN. When a next monthly deposit of $200 is made into the member's HSA, the server routes $100 to the EAA, the EBA, or the line of credit to complete the repayment of the original $300, and $100 remains in the HSA. Each transfer is executed upon the execution of one or more payment algorithms or modules 38 (e.g., a set of computer-executable instructions) stored in the memory 16 and executed by the processor 14. In this manner, billing is simplified at the healthcare provider's end, where payment timeliness is improved and tracking is simplified.

The omnibus account 30 may be viewed as a collective HSA account (e.g., for a plurality of members on an employer's health plan) and is maintained by the server (the service provider) to control payment data and funds from multiple members' HSAs, employers' EAAs, EBAs, lines of credit, and/or HRAs in order to simplify payment to a healthcare provider. For example an employer may have 100 employees on its healthcare plan, and monthly contributions for all employees may be transferred to the omnibus account. Any contributions or payments attributable to individual members' HSAs are tracked by UIDNs associated with the lump sum contributions or payments and stored in the LUT 36. In another example, the lump payment may be transferred from a single HSA 22 or the aggregating account 28, e.g., in a case where only a single employee owes a payment to the healthcare provider.

According to another example, an employer 40 is provided with a software product 42 (e.g., computer-executable instructions, program(s), routine(s), algorithm(s), etc. persistently stored to a computer-readable medium and executed by a processor) that tracks an amount that each employee needs to pay to his or her HSA. The software product (optionally upon the employer's approval), sends a lump sum amount through the SPS 12 to the employer's bank account 44, which then transfers the lump sum to the service provider's omnibus account 30. The service provider's server 12 has stored in memory 16 employee census information 46 that is analyzed by the processor 14 upon execution of the payment algorithm(s) 38 to identify portions of the omnibus payment as originating from individual employees' HSA accounts. The deposited amounts are then tracked as individual employees' contribution amounts. If payments are to be made, in one example, if a total of $1000 is transferred to the omnibus account for three employees who respectively owe $200, $300, and $500 to a given healthcare provider, then a table lookup is performed to cross reference UDIN's associated with the $1000 omnibus payment with UIDNs for the three employees. Separate payments are then transferred from the service provider's omnibus account 30 to the healthcare provider's account 20 for the three employees in the three respective dollar amounts. As will be appreciated by one of skill in the art, the memory 16 additionally stores member account information 48 and employer account information 50 that facilitates the here-described transactions.

As previously mentioned, the system 10 comprises the processor 14 that executes, and memory 16 that stores, computer-executable instructions and/or computer-readable data (e.g., a software package or product) for performing the various techniques and/or methods described herein. The memory 16 may be a computer-readable recording medium on which a control program or software product is recorded, such as a disk, hard drive, or the like. Common forms of computer-readable media include, for example, floppy disks, flexible disks, hard disks, magnetic tape, or any other magnetic storage medium, CD-ROM, DVD, or any other optical medium, a ROM, a PROM, an EPROM, a FLASH-EPROM, or other memory chip or cartridge, or any other tangible medium from which a computer can read and use. Alternatively, the methods may be implemented in a transmittable carrier wave in which the control program is embodied as a data signal using transmission media, such as acoustic or light waves, such as those generated during radio wave and infrared data communications, and the like.

It will be appreciated that all financial transfers, transactions, etc., and any appended health-related patient information is encrypted using a secure socket layer (SSL) 128-bit encryption protocol.

The following description provides a plurality of examples in which the systems and methods described herein may be implemented, and/or advantages that are achieved using the system of FIG. 1 and/or the methods described herein.

In one example, members and their dependents (i.e., children or other family members covered under the employer's insurance plan or self funded plan) are photographed, and member photo data 52 is stored in the memory 16. The member photo data 52 may be accessed by a healthcare provider system 54 (e.g., a physician's computer system or network, at the point of service, etc.,) when a member visits the provider's healthcare facility, in order to verify the identity of the member or the dependent to prevent fraud (e.g., to prevent a scenario in which an uncle brings a nephew to the facility and claims the nephew is a son or other covered dependent on a family plan). In the illustrated embodiment, member photo data is stored in the memory 16, and accessible by the employee system (e.g. a computer system or network) via the Internet 18. In an alternative embodiment, the member photo data 52 is stored locally (e.g., downloaded from the server memory 16) on the healthcare provider's system or network 54. In this manner, various types of healthcare fraud are mitigated.

According to another example, the processor 14 analyzes transaction data to determine whether a particular purchase (e.g., using an HSA debit card at a pharmacy or other retail counter or website) or a particular procedure at a healthcare provider (e.g., a cosmetic procedure not covered by the member's insurance policy) should be reviewed. If so, then the processor executes a "trigger review" algorithm or module 56 that sends an alert to an insurance provider 58 and/or the employer system 40 to review the member's purchase or procedure to ensure that it is covered and not fraudulent.

In another example, the member account data 48 includes a unique personal identification number (PIN) for each member, which the member inputs into the system at the place of service of the healthcare provider at each visit, which identifies the member and his or her dependents. For instance, the PIN may be used to retrieve member account data 48, member photo data 52, etc., in order to mitigate healthcare fraud. In another embodiment, the provider submits the invoice using his or her specific PIN number in order to mitigate healthcare fraud.

It will be appreciated that other types of member identification measures, techniques, procedures, etc., may be employed in conjunction with the various systems and methods described herein, and that the described systems and methods are not limited to PIN number identification techniques. For instance, biometric systems (e.g., retina scan, fingerprint scan, face recognition, or the like) may be employed to identify the member and/or the provider.

According to other examples described herein, the member is not required to present a debit card or other payment form during his or her visit. Rather, the member provides insurance or health plan information (e.g., healthcare company group number, patient number, etc.) and the server 12 provides all relevant information (e.g., member account data 48, employer account data 50, member photo data 52, healthcare plan coverage data, census data 46, etc.) to the healthcare provider.

In another example, the system offers a reduced payment to the healthcare provider 54 in exchange for immediate or prompt acceptance. For example the payment algorithm(s) 38 may offer the healthcare provider a fixed amount or predetermined percentage (e.g., 60%, 80%, 90%, or some other predetermined percentage of a preset fee schedule such as the CMS (medicare) fee schedule or Preferred Provider Organization (PPO) so as to adjust the amount owed by a given member (or employer) in return for the healthcare provider accepting the payment within a predetermined time period (e.g., one hour, six hours, one business day, 5 business days, one month, etc.). In this manner, the healthcare provider is rewarded with prompt payment, and the member and/or employer saves valuable pre-tax HSA dollars or employer dollars. In a related example, the payment algorithm(s) 38 offer the healthcare provider a tiered payment percentage (e.g., 90% if accepted immediately, 80% if accepted within 1-24 hours, 70% if accepted within 24-72 hours, etc.) in order to encourage the healthcare provider to accept a reduced amount quickly while saving money for the member and/or employer. In a related example, the payment algorithm 38 offers the healthcare provider some percentage of a payment that would be received under Medicare, such as 90%, 100%, 103%, 105%, etc, as a standard payment offer.

According to another example, the photo data 52 is made available to a pharmacy system 60 to prevent healthcare fraud (e.g., a non-member using a member's account or debit card to purchase health-related items covered under the member's HSA.

In yet another example, the server provides to the members a website on which HSA bank account, healthcare provider claims, etc., are merged. The website is managed by the service provider.

In another example the service provider server 12 processes interest and performed other calculations related to monies owed by members and/or employers for healthcare services rendered by the healthcare provider.

According to another example, patients or members are permitted (via the service provider) to negotiate payments for rendered healthcare services. For instance, a patient may offer the healthcare provider a tiered payment percentage (e.g., 90% if accepted immediately, 85% if accepted within 1-24 hours, 75% if accepted within 24-72 hours, etc.) in order to encourage the healthcare provider to accept a reduced amount quickly while saving money for the member and/or employer. In a related example the membe may offer the healthcare provider a reduced amount (e.g., 70% of the bill) if accepted promptly, as opposed to the option of submitting the requisite forms and waiting for payment to clear the regular channels if the reduced amount is not accepted. In this manner, the healthcare provider is incentivized to accept a reduced payment in exchange for prompt payment. Alternatively, the healthcare provider can accept delayed payment in exchange for receiving the full invoice amount. In another example the member may ask the provider for a further discount for personal business reasons. Such discounts granted are tracked and this data is provided to other members.

In another example, a member webpage 62 is accessible by members whose employers subscribe to or otherwise use the service. The webpage aggregates member HSA bank account information, insurance provider information, claims information, etc., for the member. Surveys may be presented to members asking a few questions by which the healthcare provider visited by the member may be ranked. The questions may include without limitation subjects related to the duration of the member's wait at the healthcare provider's office, whether the member's expectations were met, whether the member would return to or otherwise recommend the healthcare provider, etc. In accordance with other aspects, the webpage 62 presents a breakdown of member spending (e.g., dental, eye, medical, cosmetic, etc.).

According to other features, the payment algorithm 38 encourages doctor acceptance of payment. For instance, if the doctor accepts the offer payment immediately, he will receive payment within a predetermined time period (e.g., 72 hours), and he can avoid having to fill out forms to submit a request for payment through the usual channels, sending reminders and having to bill the member, etc.

The system further includes a pharmacy benefit manager (PBM) module 64, which ensures that a pharmacy that services a member whose employer uses the system 10 will receive payment for services or pharmaceuticals rendered within a predetermined time period (e.g., 30 days or the like).

According to another feature of the herein-described systems and methods, a healthcare provider can attach medical reports directly to a bill or invoice via the Internet for documentation (for utilization reviews, etc.). In this manner, if a review of a claim is triggered (e.g., by the triggering algorithm 56), the insurance provider 58 can readily evaluate whether the procedure was necessary, covered, whether the diagnosis was correct, etc. For instance, the processor may execute instructions for analyzing a submitted claim or invoice to identify any suspect treatments, prescriptions, charges etc. (e.g., based on a comparison of the invoice to a standardized or predetermined list of accepted treatments, prescriptions, charges, etc.). If one or more suspect events is present, the processor executes the trigger review module or algorithm 56 to flag the invoice or claim for review (e.g., by the service provider or the insurance provider. However, the healthcare provider is permitted to append documentation (i.e., medical reports, diagnoses, etc.) in support of the charges in the invoice to assist the insurance provider in approving the claim, which in turn expedites payment to the healthcare provider.

In another example members can access the webpage 62 to identify healthcare providers that accept discounted payments in exchange for rapid payment. For example, providers may be ranked according to the size of the discount they typically accept (e.g., 50%, 40%, 30%, etc.) and members can select a healthcare provider accordingly. The provider benefits from accepting greater discounts by increased patient base and rapid payment (e.g., within 72 hours or some other predetermined period), and the member benefits from being able to identify a healthcare provider with reasonable prices.

Figure 2:
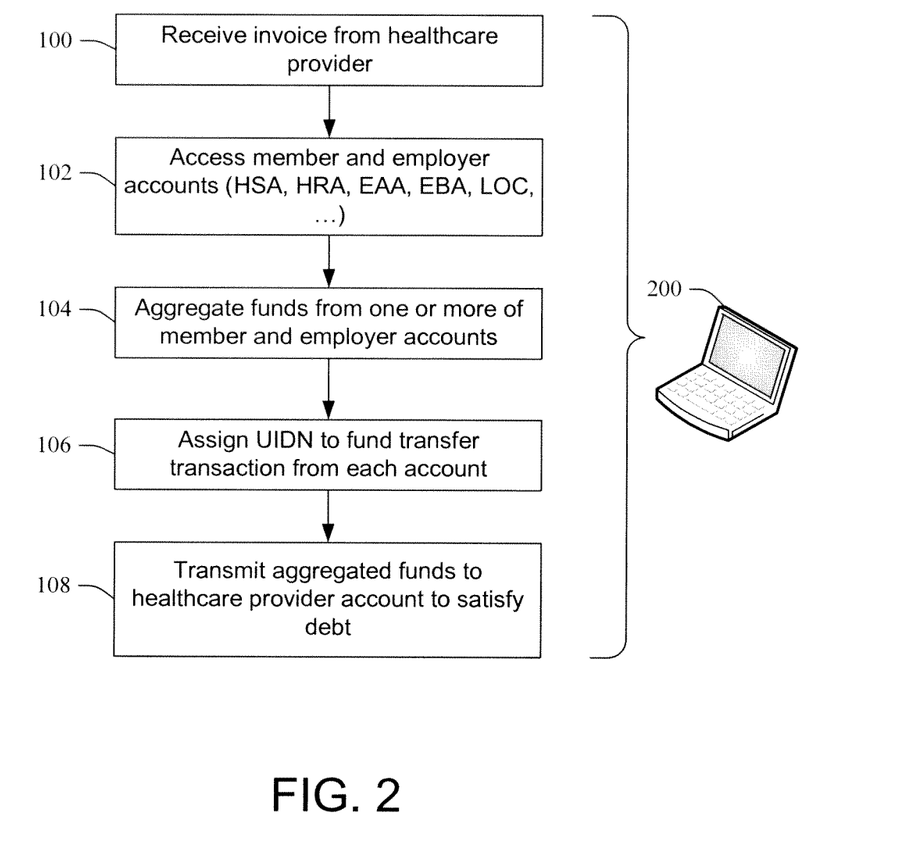
FIG. 2 illustrates a method for aggregating payment to a healthcare provider from a plurality of sources, in accordance with various aspects described herein.
Figure 3:
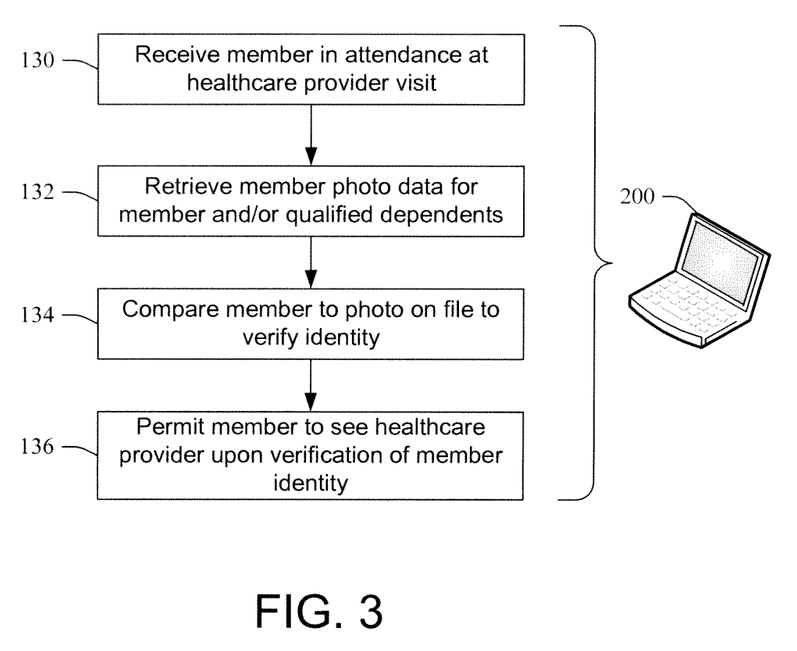
FIG. 3 illustrates a method for preventing healthcare fraud by verifying user identity using pre-stored photo information and/or member-specific and provider-specific PINs.
Figure 4:
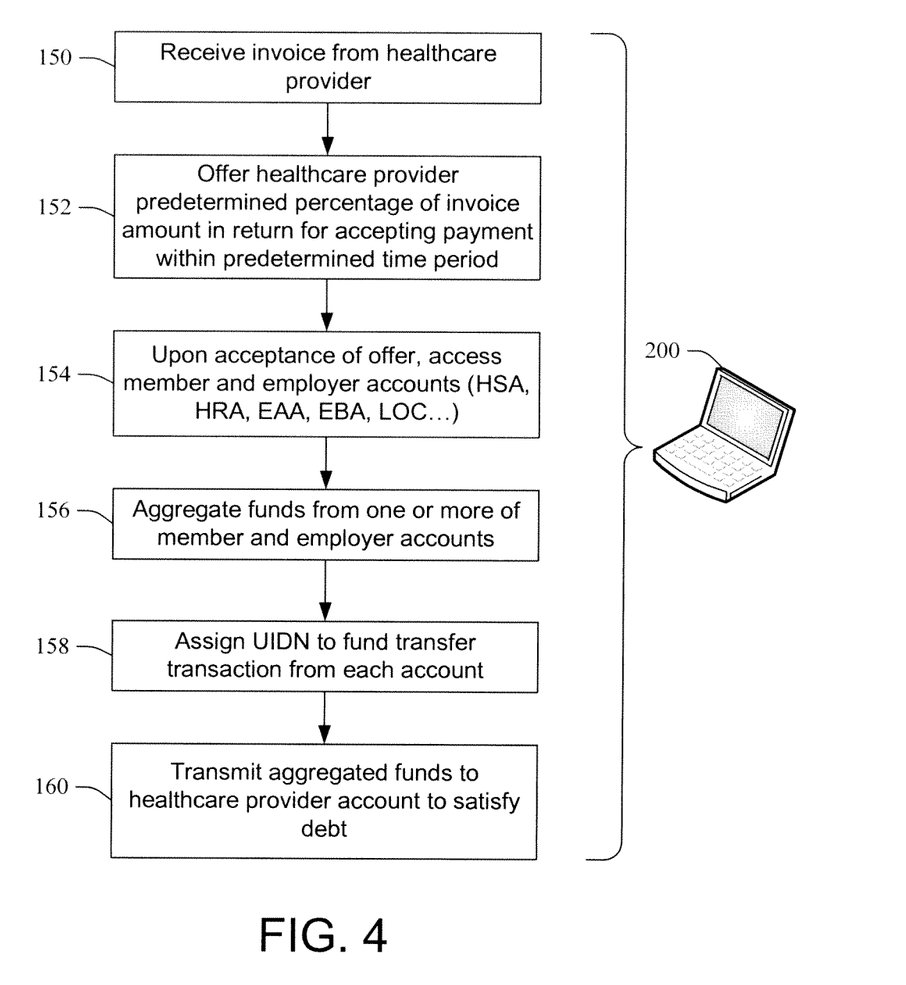
FIG. 4 illustrates a method for aggregating payment to a healthcare provider from a plurality of sources, in accordance with various aspects described herein.

FIGS. 2-4 illustrate a method related to integrating healthcare insurance, claims, payment, and banking, in accordance with various features. While the methods are described as a series of acts, it will be understood that not all acts may be required to achieve the described goals and/or outcomes, and that some acts may, in accordance with certain aspects, be performed in an order different that the specific orders described. The methods of FIGS. 2-4 may be implemented on a computer 200, as described below. Additionally, it will be appreciated that the methods of FIGS. 2-4 may be performed separately or in conjunction with each other.

FIG. 2 illustrates a method for aggregating payment to a healthcare provider from a plurality of sources, in accordance with various aspects described herein. At 100, an invoice is received from a healthcare provider that has provided a health-related service or product to a member of an employer's health plan. At 102, the member's member account (e.g., HSA, HRA, or the like) is accessed to retrieve funds for payment to the healthcare provider. That is, upon signing up for the service, the member authorizes the service to access the member account as necessary to retrieve funds for paying healthcare invoices. Additionally, a determination is made regarding whether there are insufficient funds in the member account, in which case the service provider accesses related one or more employer accounts (e.g., EAA, EBA, line of credit, etc.) to withdraw additional funds to fully pay the amount listed on the invoice. At 104, funds from the member account and funds from the employer account are aggregated. At 106, each amount withdrawn from each account is associated with a UIDN, as described above, to facilitate transaction tracking and member payback of funds borrowed from the advance account. At 108, the aggregated funds are transmitted to the healthcare provider's account to satisfy the debt listed on the invoice.

FIG. 3 illustrates a method for preventing healthcare fraud by verifying user identity using pre-stored photo information and/or member-specific and provider-specific PINs (or other identification means, such as biometric identification techniques or the like). For instance, a member is received at a healthcare provider for a healthcare appointment, and enters a unique PIN, at 130. At 132, a healthcare provider employee (e.g., a receptionist or assistant, or the provider himself or herself) retrieves a photo of the member to be treated (e.g., a primary member, a dependent of the primary member, etc.). At 134, the healthcare employee compares the member to be treated to the photo on file to verify that the member is in fact the member to be treated. At 136, upon verification of the member's identity via the file photo comparison, the member is permitted to see the healthcare provider.

FIG. 4 illustrates a method for aggregating payment to a healthcare provider from a plurality of sources, in accordance with various aspects described herein. At 150, an invoice is received from a healthcare provider that has provided a health-related service or product to a member of an employer's health plan. At 152, the healthcare provider is offered a predetermined percentage of the invoice amount in return for accepting the predetermined percentage within a predetermined time period. In this manner, the healthcare provider can be rewarded with prompt payment in exchange for accepting less than then full amount of the invoice. For instance, the provider may be offered 75% of the invoice amount if the provider accepts payment within 72 hours of the offer, 80% if the provider accepts within between 3 and 7 business days, 85% if the provider accepts within 7 and 30 calendar days, and so on. In this manner, the provider is paid more quickly in return for a reduced fee. In another embodiment, the predetermined percentages and/or acceptance schedule is determined as a function of the service provided or procedure performed by the healthcare provider.

At 154, upon acceptance of the offered amount by the healthcare provider, a member account (e.g., an HSA, HRA, or the like) is accessed to retrieve funds for payment to the healthcare provider. That is, upon signing up for the service, the member authorizes the service to access the member's HSA as necessary to retrieve funds for paying healthcare invoices. Additionally, if there are insufficient funds in the member's account, the service provider accesses related employer accounts (e.g., EAA, EBA, employer line of credit, or other employer account(s)) to withdraw additional funds to fully pay the amount listed on the invoice. At 156, funds from the member's HSA and the employer's HRA, EBA, line of credit, and/or EAA are aggregated. At 158, each amount withdrawn from each account is associated with a UIDN, as described above, to facilitate transaction tracking and member payback of funds borrowed from the HRA, EBA, line of credit, or EAA. At 160, the aggregated funds are transmitted to the healthcare provider's account to satisfy the debt listed on the invoice.

In another example the member is permitted to negotiate (e.g., offer a reduced payment in exchange for prompt payment of funds from the HSA or the aggregating account, regardless of whether the member borrows from the employer advance account, i.e., regardless of whether the HSA has sufficient funds to cover the invoice amount or the reduced amount offered). In another example the negotiation is performed automatically by the service provider.

The methods illustrated in FIGS. 2-4 may be implemented in a computer program product that may be executed on a computer 200 or processor such as the processor 14 in the system of FIG. 1. Further, it is to be appreciated that any suitable computing environment can be employed in accordance with the present embodiments. For example, computing architectures including, but not limited to, stand alone, multiprocessor, distributed, client/server, minicomputer, mainframe, supercomputer, digital and analog can be employed in accordance with the present embodiments.

The computer can include a processing unit such as the processor 16 of FIG. 1, a system memory such as the memory 16 of FIG. 1, and a system bus that couples various system components including the system memory to the processing unit. The processing unit can be any of various commercially available processors (e.g., a central processing unit, a graphical processing unit, etc.). Dual microprocessors and other multi-processor architectures also can be used as the processing unit.

The system bus can be any of several types of bus structure including a memory bus or memory controller, a peripheral bus, and a local bus using any of a variety of commercially available bus architectures. The computer memory includes read only memory (ROM) and random access memory (RAM). A basic input/output system (BIOS), containing the basic routines that help to transfer information between elements within the computer, such as during start-up, is stored in ROM.

The computer can further include a hard disk drive, a magnetic disk drive, e.g., to read from or write to a removable disk, and an optical disk drive, e.g., for reading a CD-ROM disk or to read from or write to other optical media. The computer typically includes at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above can also be included within the scope of computer readable media.

A number of program modules may be stored in the drives and RAM, including an operating system, one or more application programs, other program modules, and program non-interrupt data. The operating system in the computer can be any of a number of commercially available operating systems.

A user may enter commands and information into the computer through a keyboard (not shown) and a pointing device or stylus (not shown), such as a mouse. Other input devices (not shown) may include a microphone, an IR remote control, a joystick, a game pad, a satellite dish, a scanner, or the like. These and other input devices are often connected to the processing unit through a serial port interface (not shown) that is coupled to the system bus, but may be connected by other interfaces, such as a parallel port, a game port, a universal serial bus (USB), an IR interface, etc.

A monitor (not shown), or other type of display device, may also be connected to the system bus via an interface, such as a video adapter (not shown). In addition to the monitor, a computer typically includes other peripheral output devices (not shown), such as speakers, printers etc. The monitor can be employed with the computer to present data that is electronically received from one or more disparate sources. For example, the monitor can be an LCD, plasma, CRT, etc. type that presents data electronically. Alternatively or in addition, the monitor can display received data in a hard copy format such as a printer, facsimile, plotter etc. The monitor can present data in any color and can receive data from the computer via any wireless or hard wire protocol and/or standard.

The computer can operate in a networked environment using logical and/or physical connections to one or more remote computers, such as a remote computer(s). The remote computer(s) can be a workstation, a server computer, a router, a personal computer, microprocessor based entertainment appliance, a peer device or other common network node, and typically includes many or all of the elements described relative to the computer. The logical connections depicted include a local area network (LAN) and a wide area network (WAN). Such networking environments are commonplace in offices, enterprise-wide computer networks, intranets and the Internet.

When used in a LAN networking environment, the computer is connected to the local network through a network interface or adapter. When used in a WAN networking environment, the computer typically includes a modem, or is connected to a communications server on the LAN, or has other means for establishing communications over the WAN, such as the Internet. In a networked environment, program modules depicted relative to the computer, or portions thereof, may be stored in the remote memory storage device. It will be appreciated that network connections described herein are exemplary and other means of establishing a communications link between the computers may be used.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system that facilitates online healthcare fund aggregation and payment of healthcare provider invoices, comprising:
   a processor that executes computer-executable instructions configured to aggregate funds from multiple healthcare-related accounts and payment to a healthcare provider;
   a memory that stores the computer-executable instructions; and
   a server comprising the processor and the memory and providing Internet access to the processor for fund aggregation and healthcare invoice payment;
   wherein the instructions comprise:
      receiving an electronic invoice from a healthcare provider;
      identifying the healthcare provider as one that will accept a predetermined percentage of an invoice amount within a predetermined time period, wherein the predetermined percentage is less than 100% of the invoice amount;
      accessing a member account comprising at least one of a health savings account (HSA) belonging to a member of a healthcare plan and a health reimbursement account (HRA) maintained by the employer of the member;
      withdrawing funds to pay the predetermined percentage of the invoice amount from the member account, if funds are available in the member account;
      accessing an employer account comprising at least one of an employer advance account (EAA), an employer bank account (EBA), and an employer line of credit maintained by an employer providing the healthcare plan to the member;
      withdrawing additional funds from the employer account to satisfy the predetermined percentage of the invoice amount when the member account does not have sufficient funds to satisfy the predetermined percentage of the invoice amount;
      tracking deposits into the member HSA, and, pursuant to a determination that funds subsequently are available in the HSA, automatically transferring funds from the HSA to the EAA until the additional funds withdrawn therefrom to satisfy the predetermined percentage of the invoice amount are repaid to the EAA;
      aggregating the funds from the member account and the additional funds from the employer account in an aggregating account (AA);
      transferring the aggregated funds from the aggregating account to a healthcare provider account to pay the predetermined percentage of the invoice amount within the predetermined time period; and
      offering the healthcare provider the predetermined percentage of the invoice amount pursuant to the healthcare provider accepting the predetermined percentage within the predetermined time period, wherein the predetermined percentage is a higher percentage when the healthcare provider accepts delayed payment from the aggregating account.

2. The system of claim 1, wherein:
   the member account comprises at least one of a health savings account (HSA) belonging to a member of a healthcare plan and a health reimbursement account (HRA) maintained by the employer of the member; and
   the employer account comprises at least one of an employer advance account (EAA), an employer bank account (EBA), and an employer line of credit.

3. The system of claim 2, wherein the instructions further comprise assigning a unique identification number (UIDN) to each withdrawal and transfer of funds.

4. The system of claim 3, wherein the instructions further comprise using the UIDNs to track deposits into the member HSA.

5. The system of claim 1, further comprising photographic data for each member of the healthcare plan, stored in the memory and retrievable at a point of service in order to verify member identity.

6. The system of claim 1, wherein the predetermined percentage increases as a function of time, and wherein the healthcare provider is offered a lower percentage in exchange for prompt payment from the aggregating account and a higher percentage in exchange for delayed payment from the aggregating account.

7. The system of claim 1, the instructions further comprising receiving a member personal identification number (PIN) at a point of service, wherein the member PIN identifies the member as being covered by the healthcare plan, and receiving a healthcare provider PIN at the time of invoice generation by which the healthcare provider verifies that the invoice is accurate.

8. The system of claim 1, the instructions further comprising triggering a review of the invoice upon a determination that one or more items listed therein are inconsistent with a predetermined set of approved items consistent with a diagnosis listed in the invoice.

9. The system of claim 8, receiving from the healthcare provided appended invoice documentation in support of the items listed in the invoice.

10. A computer-executable method of online healthcare fund aggregation for payment of healthcare provider invoices, comprising:
    receiving an electronic invoice from a healthcare provider;
    identifying the healthcare provider as one that will accept a predetermined percentage of an invoice amount within a predetermined time period, wherein the predetermined percentage is less than 100% of the invoice amount;

accessing a member account comprising at least one of a health savings account (HSA) belonging to a member of a healthcare plan and a health reimbursement account (HRA) maintained by the employer of the member;

withdrawing funds to pay the predetermined percentage of the invoice amount from the member account, if funds are available in the member account;

accessing an employer account comprising at least one of an employer advance account (EAA), an employer bank account (EBA), and an employer line of credit maintained by an employer providing the healthcare plan to the member;

withdrawing additional funds from the employer account to satisfy the predetermined percentage of the invoice amount when the member account does not have sufficient funds to satisfy the predetermined percentage of the invoice amount or when the employer plan is required to pay the invoice;

tracking deposits into the member HSA, and, pursuant to a determination that funds subsequently are available in the HSA, automatically transferring funds from the HSA to the EAA until the additional funds withdrawn therefrom to satisfy the predetermined percentage of the invoice amount are repaid to the EAA;

aggregating, via a processor, the funds from the member account and the additional funds from the employer account in an aggregating account (AA);

transferring the aggregated funds from the aggregating account to a healthcare provider account to pay the predetermined percentage of the invoice amount within the predetermined time period; and offering the healthcare provider the predetermined percentage of the invoice amount pursuant to the healthcare provider accepting the predetermined percentage within the predetermined time period, wherein the predetermined percentage is a higher percentage in exchange for accepting delayed payment from the aggregating account.

11. The method of claim 10, further comprising assigning a unique identification number (UIDN) to each withdrawal and each transfer of funds.

12. The method of claim 11, further comprising using the UIDNs to track deposits into the member HSA.

13. The method of claim 10, further comprising storing photographic data for each member of the healthcare plan, and electronically retrieving a digital photograph of the member at the point of service in order to verify member identity.

14. The method of claim 1, wherein the predetermined percentage increases as a function of time, and wherein the healthcare provider is offered a lower percentage in exchange for prompt payment from the aggregating account and a higher percentage in exchange for delayed payment from the aggregating account.

15. The method of claim 10, further comprising receiving a member personal identification number (PIN) at a point of service, wherein the member PIN identifies the member as being covered by the healthcare plan, and receiving a healthcare provider PIN at the time of invoice generation by which the healthcare provider verifies that the invoice is accurate.

16. The method of claim 10, further comprising triggering a review of the invoice upon a determination that one or more items listed therein are inconsistent with a predetermined set of approved items consistent with a diagnosis listed in the invoice.

17. The method of claim 16, further comprising receiving from the healthcare provider appended invoice documentation in support of the items listed in the invoice.

* * * * *